US008996374B2

(12) United States Patent
Bapat

(10) Patent No.: US 8,996,374 B2
(45) Date of Patent: Mar. 31, 2015

(54) SENONE SCORING FOR MULTIPLE INPUT STREAMS

(71) Applicant: Spansion LLC, Sunnyvale, CA (US)

(72) Inventor: Ojas A. Bapat, Sunnyvale, CA (US)

(73) Assignee: Spansion LLC, Sunnyvale, CA (US)

( * ) Notice: Subject to any disclaimer, the term of this patent is extended or adjusted under 35 U.S.C. 154(b) by 204 days.

(21) Appl. No.: 13/669,907

(22) Filed: Nov. 6, 2012

(65) Prior Publication Data

US 2014/0129217 A1 May 8, 2014

(51) Int. Cl.
| | |
|---|---|
| G10L 15/00 | (2013.01) |
| G10L 15/04 | (2013.01) |
| G10L 17/00 | (2013.01) |
| G10L 15/02 | (2006.01) |
| G10L 15/187 | (2013.01) |

(52) U.S. Cl.
CPC ............... *G10L 15/02* (2013.01); *G10L 15/187* (2013.01); *G10L 2015/022* (2013.01)
USPC ............................ 704/254; 704/246; 704/231

(58) Field of Classification Search
USPC .................. 704/231, 255, 256, 256.1, 4, 6, 7
See application file for complete search history.

(56) References Cited

U.S. PATENT DOCUMENTS

| | | | |
|---|---|---|---|
| 6,542,866 B1 | 4/2003 | Jiang et al. | |
| 6,804,642 B1 * | 10/2004 | Naylor | 704/231 |
| 7,080,011 B2 * | 7/2006 | Baumgartner et al. | 704/231 |
| 7,480,617 B2 * | 1/2009 | Chu et al. | 704/256 |
| 7,493,258 B2 * | 2/2009 | Kibkalo et al. | 704/242 |
| 8,352,265 B1 * | 1/2013 | Lin et al. | 704/256.6 |
| 2010/0057451 A1 * | 3/2010 | Carraux et al. | 704/231 |
| 2011/0082694 A1 | 4/2011 | Fastow et al. | |

OTHER PUBLICATIONS

Pending Application, U.S. Appl. No. 13/489,799, inventors Fastow et al., filed Jun. 6, 2012, not published.
International Search Report and Written Opinion of the International Searching Authority for International Application No. PCT/US2013/068449, mailed Feb. 25, 2014.
Chun, A., et al., "ISIS: An Accelerator for Sphinx Speech Recognition", 2011 IEEE 9$^{th}$ Symposium on Application Specific Processors (SASP), pp. 5-6, Jun. 5-6, 2011 (URL: http://ieeexplore.ieee.org/xpl/articleDetails.jsp?=p+&arnumber=5941078).
Pazhayaveetil, U., et al., "Flexible Low Power Probability Density Estimation Unit for Speech Recognition", IEEE International Symposium on Circuits and Systems, pp. 1117-1120, May 27-30, 2007 (URL: http://ieeexplore.ieee.org/xpl/login.jsp?tp=&arnumber=4252835).

* cited by examiner

*Primary Examiner* — Jesse Pullias
(74) *Attorney, Agent, or Firm* — Sterne Kessler Goldstein & Fox P.L.L.C.

(57) ABSTRACT

Embodiments of the present invention include an apparatus, method, and system for calculating senone scores for multiple concurrent input speech streams. The method can include the following: receiving one or more feature vectors from one or more input streams; accessing the acoustic model one senone at a time; and calculating separate senone scores corresponding to each incoming feature vector. The calculation uses a single read access to the acoustic model for a single senone and calculates a set of separate senone scores for the one or more feature vectors, before proceeding to the next senone in the acoustic model.

17 Claims, 7 Drawing Sheets

SENONE SCORING FOR MULTIPLE INPUT STREAMS

CROSS REFERENCE TO RELATED APPLICATION

This application is related to patent application Ser. No. 13/489,799, filed Jun. 6, 2012, titled "Acoustic Processing Unit," which is incorporated by reference in its entirety.

BACKGROUND

1. Field

Embodiments of the present invention generally relate to speech recognition. More particularly, embodiments of the present invention relate to processing multiple input speech streams using one or more acoustic models.

2. Background

Real-time data pattern recognition is increasingly used to analyze data streams in electronic systems. On vocabularies with over tens of thousands of words, speech recognition systems have achieved improved accuracy, making it an attractive feature for electronic systems. For example, speech recognition systems are increasingly common in consumer markets targeted to data pattern recognition applications such as in mobile device, server, automobile, and PC markets.

Despite the improved accuracy in speech recognition systems, significant computing resources are dedicated to the speech recognition process, in turn placing a significant load on computing systems such as, for example, the memory environment.

The memory environment stores data from multiple frames that are being analyzed. This requires a large memory array, both in terms of the number of entries in the array and the width of each entry. Such large memory arrays can be slow and require significant power in order to read from and write to them. The size of the memory and the load placed on the memory by the speech recognition process affects the speed at which the computing system can process incoming voice signals, while executing other applications. Further, for handheld devices that typically include limited memory resources (as compared to desktop computing systems, for example), speech recognition applications not only place significant load on the handheld device's computing resources but also consume a significant portion of the handheld device's memory resources.

The above speech recognition system issues of processing capability, speed, and memory resources are further exacerbated by the need to process incoming voice signals in real-time or substantially close to real-time. To reduce the resource constraints placed on user devices, while still providing real-time or substantially close to real-time speech recognition, the speech processing computation can be done by central servers. An advantage, among others, of using a centralized server to process speech is that the resource intensive operations can be executed by a more powerful system, leaving the resources on user devices available for other applications. This is especially useful for mobile applications, like car systems or phone systems, where resources can be limited.

But, in the server environment, memory bandwidth has become a significant area of contention. As discussed above, vocabularies can have tens of thousands of words. In addition, an acoustic model associated with a vocabulary can have thousands of senones, representing the sounds that make up the vocabulary. Speech recognition processing of such vocabularies can be computationally intensive for the server environment, especially if it must be done in real-time or substantially close to real-time.

SUMMARY

Therefore, there is a need to improve the memory architecture for speech recognition systems in a server environment.

An embodiment includes a method for acoustic processing of a plurality of input speech streams. The method can include the following: receiving a first feature vector and a second feature vector from a server device; accessing an acoustic model for a senone; and calculating a first senone score associated with the first feature vector and a second senone score associated with the second feature vector both based on the senone. Furthermore, the calculating can use a single memory access (or single read access) to the acoustic model for calculation of the first and second senone scores.

Another embodiment includes an acoustic processing acceleration device for processing a plurality of feature vectors. The acoustic processing device can include an acoustic model, a controller, and a plurality of senone scoring units (SSUs). The acoustic model can be configured to store one or more senones associated with a vocabulary. The controller can be configured to receive a set of feature vectors. The SSUs can each be configured to receive a feature vector from the controller and a senone from the acoustic model and to calculate a distance score based on the senone and the feature vector. Furthermore, the plurality of SSUs can receive the senone from the acoustic model during a single memory access (or single read access).

A further embodiment includes a speech recognition system. The speech recognition system can include a server device with system memory and an acoustic processing acceleration device coupled to the server device. The acoustic processing device can include an acoustic model, a controller, and a plurality of senone scoring units (SSUs). The acoustic model can be configured to store one or more senones associated with a vocabulary. The controller can be configured to receive a set of feature vectors. The SSUs can each be configured to receive a feature vector from the controller and a senone from the acoustic model and to calculate a distance score based on the senone and the feature vector. Furthermore, the plurality of SSUs can receive the senone from the acoustic model during a single memory access (or single read access).

Further features and advantages of the invention, as well as the structure and operation of various embodiments of the present invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

DETAILED DESCRIPTION

The following detailed description refers to the accompanying drawings that illustrate embodiments consistent with this invention. Other embodiments are possible, and modifications can be made to the embodiments within the spirit and scope of the invention. Therefore, the detailed description is not meant to limit the scope of the invention. Rather, the scope of the invention is defined by the appended claims.

It would be apparent to a person skilled in the relevant art that the present invention, as described below, can be implemented in many different embodiments of software, hardware, firmware, and/or the entities illustrated in the figures. Thus, the operational behavior of embodiments of the present invention will be described with the understanding that modifications and variations of the embodiments are possible, given the level of detail presented herein.

This specification discloses one or more embodiments that incorporate the features of this invention. The disclosed embodiments merely exemplify the invention. The scope of the invention is not limited to the disclosed embodiments. The invention is defined by the claims appended hereto.

The embodiments described, and references in the specification to "one embodiment", "an embodiment", "an example embodiment", etc., indicate that the embodiments described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to affect such feature, structure, or characteristic in connection with other embodiments whether or not explicitly described.

For exemplary purposes, a speech recognition apparatus is used to describe the apparatuses, systems, and methods below. A person of ordinary skill in the art would recognize that that these are merely examples and that embodiments of the present invention are useful in other contexts. Pattern recognition and internet packet routing are examples of other contexts where embodiments of the present invention can be used.

1. Client/Server Acoustic Communication System

Figure 1:
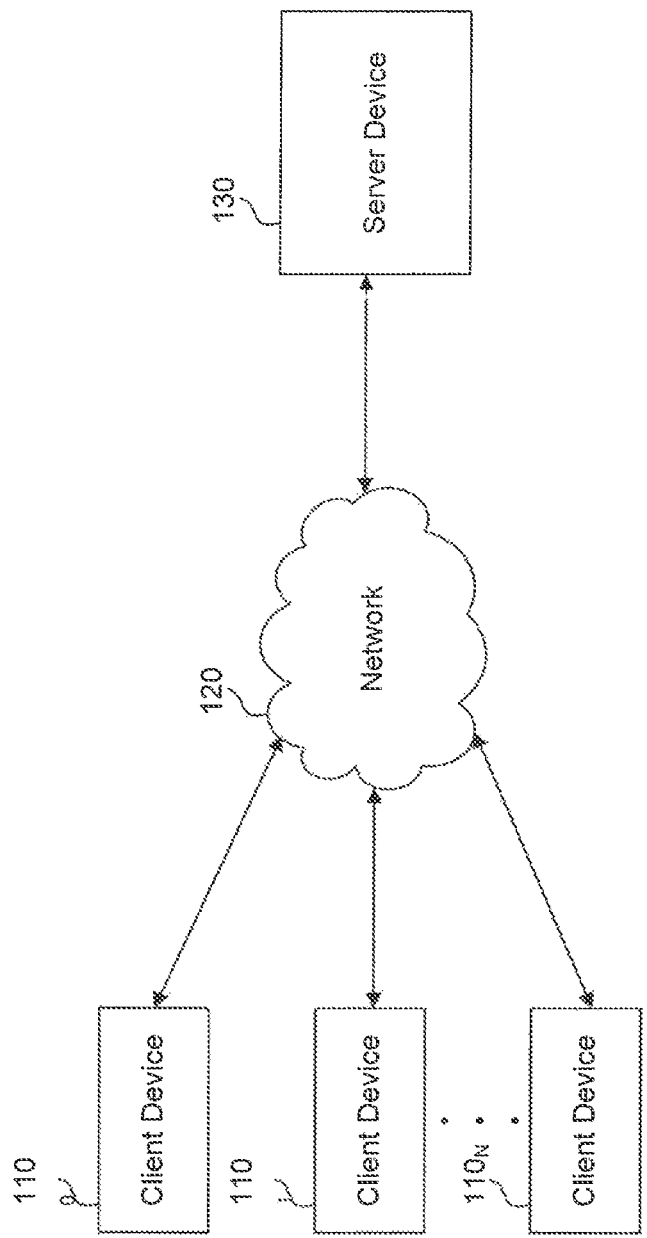
FIG. 1 is an illustration of an exemplary communication system in which embodiments can be implemented.

FIG. 1 is an illustration of an exemplary Communication System 100 in which embodiments described herein can be implemented. Communication System 100 includes Client Devices $110_0$-$110_N$ that are communicatively coupled to a Server Device 130 via a Network 120.

Client Devices $110_0$-$110_N$ can be, for example and without limitation, mobile phones, personal digital assistants (PDAs), laptops, other similar types of electronic devices, or a combination thereof.

Server Device 130 can be, for example and without limitation, a telecommunication server, a web server, or other similar types of database servers. In an embodiment, Server Device 130 can have multiple processors and multiple shared or separate memory components such as, for example and without limitation, one or more computing devices incorporated in a clustered computing environment or server farm. The computing process performed by the clustered computing environment, or server farm, can be carried out across multiple processors located at the same or different locations. In an embodiment, Server Device 130 can be implemented on a single computing device. Examples of computing devices include, but are not limited to, a central processing unit, an application-specific integrated circuit, or other types of computing devices having at least one processor and memory.

Further, Network 120 can be, for example and without limitation, a wired (e.g., Ethernet) or a wireless (e.g., Wi-Fi and 3G) network that communicatively couples Client Devices $110_0$-$110_N$ to Server Device 130.

In an embodiment, Communication System 100 can be a mobile telecommunication system (e.g., 3G and 4G mobile telecommunication systems), in which mobile devices (e.g., Client Devices $110_0$-$110_N$ of FIG. 1) can communicate with one another (e.g., via speech and data services) with the use of a mobile telecommunication network (e.g., Network 120 of FIG. 1) and a mobile network server (e.g., Server Device 130 of FIG. 1).

2. Scoring Multiple Acoustic Input Streams Structure

Figure 2:
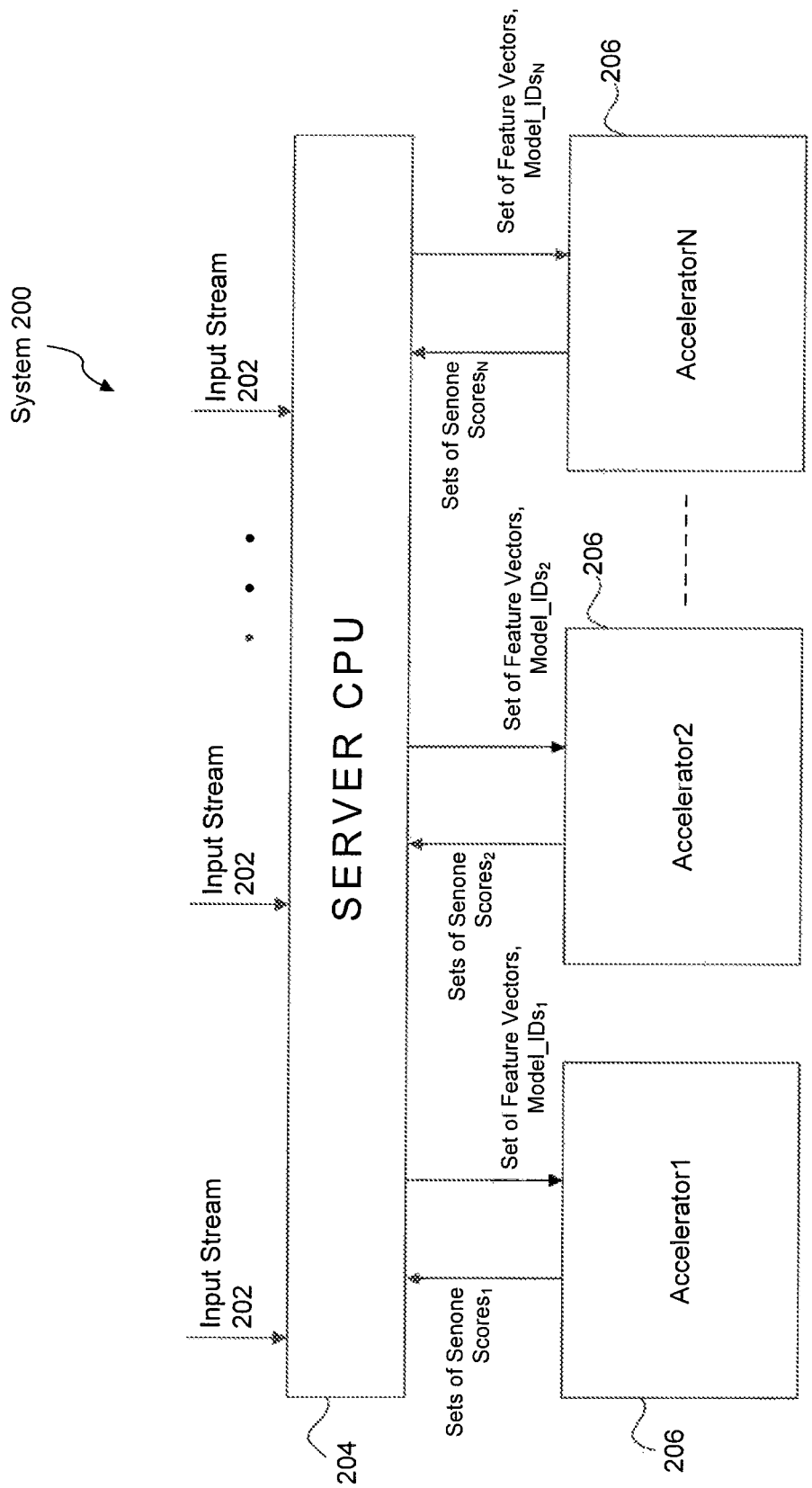
FIG. 2 is an illustration of a speech recognition system that can process multiple input streams according to an embodiment of the present invention.

To alleviate memory bottlenecks, an embodiment of a System 200 in FIG. 2 processes multiple input streams using one or more acoustic models.

As shown in FIG. 2, a Server CPU 204, for example Server Device 130 of FIG. 1, receives inputs from multiple Input Streams 202. The multiple Input Streams 202 can originate from client devices, for example, Client Devices $110_0$-$110_N$ of FIG. 1. In an embodiment, each of the Input Streams 202 can contain representations of speech from different speakers. In an embodiment, each of the Input Streams 202 can specify an acoustic model to be used to process its input. Input Streams 202 can also provide feature vector transform matrixes (FVTMs) used to modify one or more feature vectors for each speaker to more closely match each feature vector to the senones of an acoustic model. Prior to processing the speech data within Input Streams 202, Server CPU 204 can provide the hardware with a set of lists of FVTM from Input Streams 202, each of them to be used with their corresponding acoustic model. In the below descriptions, it will be assumed that the embodiments described bypass the use of the FVTM. But, details of the FVTM can be found in the related patent application Ser. No. 13/489,799, which is incorporated by reference in its entirety.

Server CPU 204 processes each of the Input Streams 202, retrieving one or more feature vectors from each Input Stream 202 according to an embodiment of the present invention. For example, Server CPU 204 can retrieve three feature vectors from one Input Stream 202, one feature vector from each of three Input Streams 202, or any combination thereof. When more than one feature vector is retrieved from an Input Stream 202, the feature vectors can be retrieved in series and processed concurrently, according to an embodiment of the present invention.

A feature vector is a parametric digital representation of a voice signal, In an embodiment, each feature vector is composed of X dimensions, where X can equal, for example, 39. In an embodiment, each of the X dimensions in each feature vector can be a 16-bit mean value.

Server CPU 204 is configured to parse the feature vectors into one or more sets of feature vectors, for example according to the acoustic model identified in each feature vector's corresponding Input Stream 202, according to an embodiment of the present invention. In FIG. 2, the acoustic model identification information is referred to as Model_IDs$_1$, Model_IDs$_2$, and Model IDs$_N$ These sets of feature vectors are then sent to an Accelerator 206 for processing.

Figure 3:
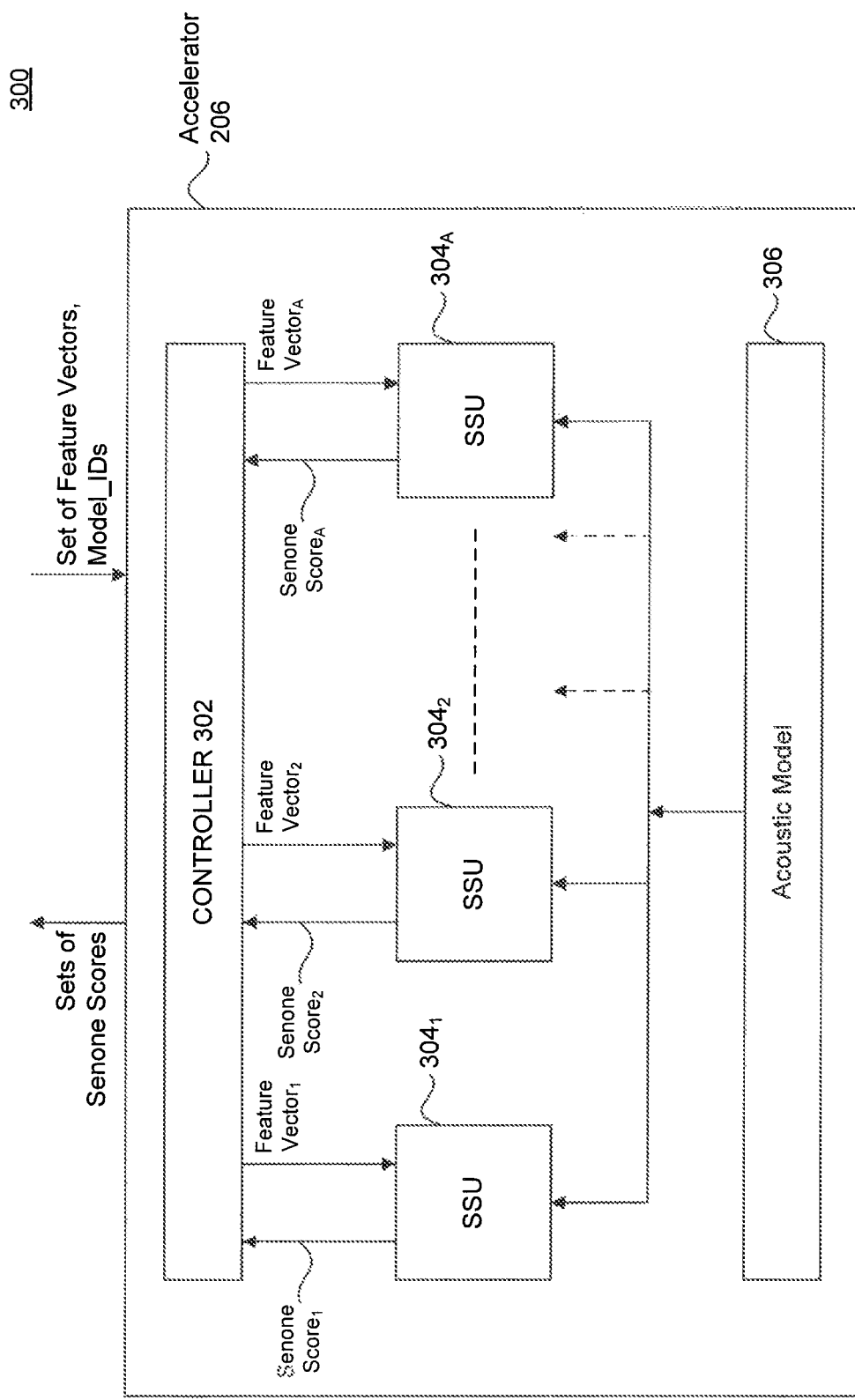
FIG. 3 is an illustration of a speech recognition accelerator that can process multiple feature vectors according to an embodiment of the present invention.

As shown in FIG. 3, Accelerator 206 is configured to process multiple feature vectors by comparing each feature vector to one or more senones of an Acoustic Model 306 associated with a vocabulary of interest. Acoustic Model 306 can be stored in a memory device, such as, for example, a Dynamic Random Access Memory (DRAM) device, Static Random Access Memory (SRAM) device, NOR Flash Memory, or any other type of memory.

In an embodiment, Accelerator 206 can include a single Acoustic Model 306 or multiple Acoustic Models 306 (only one Acoustic Model 306 is shown in FIG. 3 for ease of illustration), for processing different vocabularies, for example English, French, and Spanish. In an embodiment, the number of Accelerators 206 may not equal the number of acoustic models supported by System 200, and each Accelerator 206 can process feature vectors for one or more vocabularies. For example, System 200 can have two Accelerators 206, one that can process English and a second one that can process French and Spanish. Or System 200 can have three Accelerators 206, two that can process English and one that can process Spanish.

In an embodiment, each acoustic model can store one or more senones for one or more vocabularies. For example, an acoustic model can store senones for English or for English, French, and Spanish. Each Acoustic Model 306 can have, for example, over 1000 senones. Each of the one or more senones stored in each Acoustic Model 306 is composed of one or more Gaussian probability distributions. In an embodiment, each of the one or more Gaussian probability distributions has the same number of dimensions as each of the one or more feature vectors (i.e., X dimensions). In an embodiment, a variance can be associated with a Gaussian probability distribution vector and it can be a 16-bit value.

Server CPU 204, as pictured in FIG. 2, can send up to A feature vectors, from one or more of the N Input Streams 202 being processed, to Accelerator 206. As shown in FIG. 3, Controller 302 receives these A feature vectors and sends each one to a Senone Scoring Unit (SSU) 304. Each SSU 304 can be configured to receive a feature vector from Controller 302 and one or more Gaussian probability distributions related to a senone from Acoustic Model 306.

In an embodiment, Server CPU 204 can send more feature vectors to Accelerator 206 than the number of SSUs 304 in Accelerator 206. Accelerator 206 can stage the processing of feature vectors such that each SSU 304 processes a feature vector and, once the processing is completed by SSUs 304, all remaining feature vectors are processed. For example, if Server CPU 204 sends 10 feature vectors to Accelerator 206 that only has 5 SSUs 304, then Accelerator 206 processes 5 of the feature vectors initially and processes the remaining 5 feature vectors once SSUs 304 have completed processing the first 5 feature vectors.

In an embodiment, Server CPU 204 can send two or more sets of feature vectors to Accelerator 206, where each set of the feature vectors is associated with different vocabularies within a single acoustic model in Accelerator 206. This would require Accelerator 206 to process these sets of feature vectors in series, according to an embodiment of the present invention. For example, Server CPU 204 can send 10 feature vectors to Accelerator 206, having 10 SSUs 304 and one acoustic model with both English and Spanish vocabularies. The 10 feature vectors can include a set of four feature vectors associated with an English Model_ID and a set of six feature vectors associated with a Spanish Model_ID. Accelerator 206 reads the Model_ID of a first set of feature vectors, for example the four feature vectors associated with the English Model_D. It can process the first set of feature vectors using the English vocabulary within the acoustic model. Then, Accelerator 206 reads Model_ID of a second set of feature vectors, for example the six feature vectors associated with the Spanish Model_ID. It can process the second set of feature vectors using the Spanish vocabulary within the acoustic model. In an embodiment, if the number of SSUs 304 is less than the number of feature vectors in either the first or second set of feature vectors, Accelerator 206 can stage the processing of the feature vectors in a similar manner as described above.

In an embodiment, SSUs 304 that are using the same vocabulary to process their feature vectors can use the same Acoustic Model 306. This enables Accelerator 206 to send the same senone to these SSUs 304, By processing multiple feature vectors using the same senone retrieved during a single access from the same Acoustic Model 306, Accelerator 206 is able to limit the number of accesses to Acoustic Model 306. Thus, when Accelerator 206 is processing A feature vectors using M different Acoustic Models 206, Accelerator 206 can reduce accesses to Acoustic Models 306 by a factor of A/M.

An embodiment of SSU 304, as pictured in FIG. 4, will now be described. A SSU Control Module 402 monitors the transfer process of Gaussian probability distributions from Acoustic Model 306 to a Distance Calculator 406, according to an embodiment of the present invention. In an embodiment, SSU Control Module 402 can stagger the transfer of Gaussian probability distributions in order to pipeline the processing of the senones. After the Gaussian probability distributions associated with the first senone are sent to Distance Calculator 406, SSU Control Module 402 repeats the above process for one or more senones in Acoustic Models 306 for the vocabulary associated with the feature vector. In an embodiment, SSU Control Module 402 repeats the above process for all senones in Acoustic Model 306.

Figure 4:
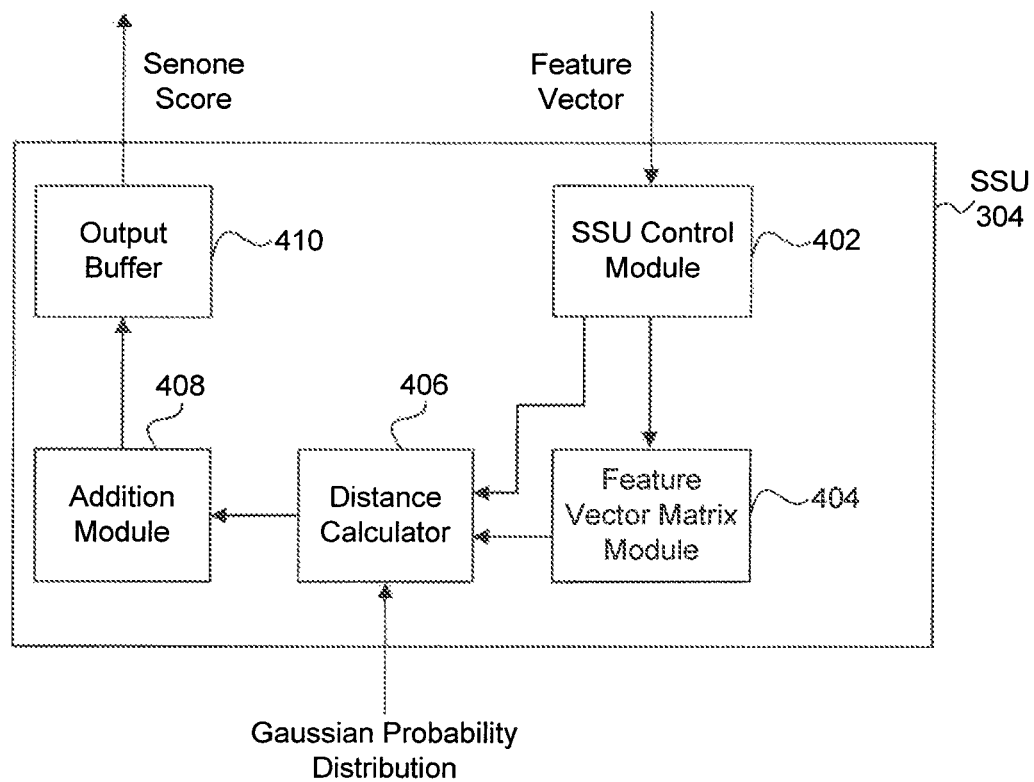
FIG. 4 is an illustration of a senone scoring unit of a speech recognition accelerator according to an enmbodiment of the present invention.
Figure 5:
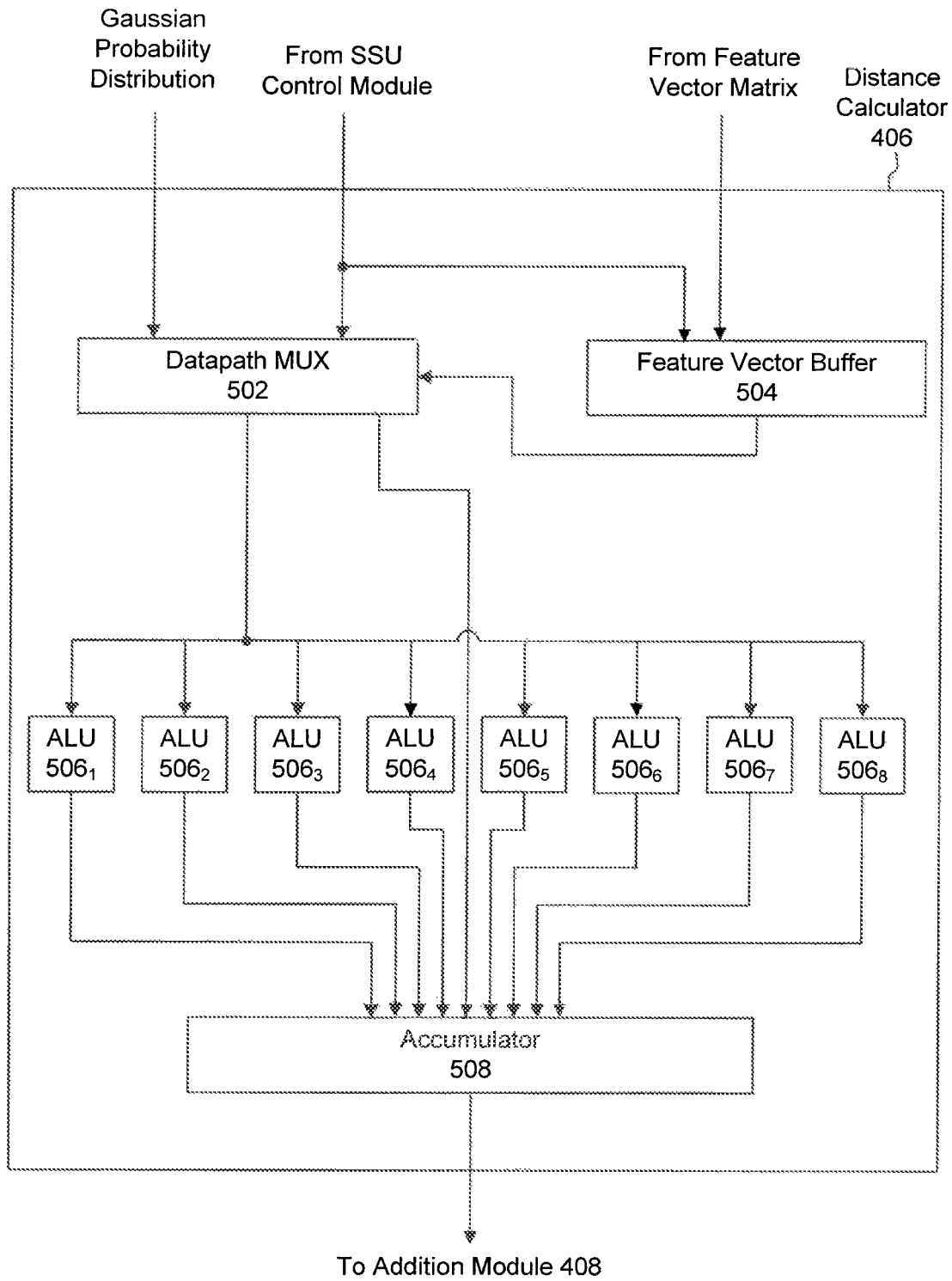
FIG. 5 is an illustration of a distance calculator of a speech recognition accelerator according to an embodiment of the present invention.

In reference to FIG. 4, Distance Calculator 406 is configured to calculate a distance between the one or more dimensions of the feature vectors and a senone stored in Acoustic Model 306 of FIG. 3. FIG. 5 is an illustration of an embodiment of Distance Calculator 406. Distance Calculator 406 includes a Datapath Multiplexer (MUX) 502, a Feature Vector Buffer 504, Arithmetic Logic Units (ALUs) 506$_1$-506$_8$, and an Accumulator 508.

Datapath MUX 502 is configured to receive a Gaussian probability distribution from Acoustic Model 306 of FIG. 3. As discussed above, the Gaussian probability distribution can have the same number of dimensions as a feature vector—e.g., 39 dimensions.

Datapath MUX 502 is also configured to receive one or more control signals and a feature vector from SSU Control Module 402 of FIG. 4. Datapath MUX 502 outputs the feature vector and Gaussian probability distribution information to ALUs 506$_1$-506$_8$ for further processing.

In an embodiment, Datapath MUX 502 is also configured to receive a Gaussian weighting factor from the one or more controls signals from SSU Control Module 402. Datapath MUX 502 is configured to output the Gaussian weighting factor to Accumulator 508 for further processing.

In reference to FIG. 5, each of ALUs $506_1$-$506_8$ is configured to calculate a distance score between a dimension of a Gaussian probability distribution received from Datapath MUX 502 and a corresponding dimension of a feature vector, according to an embodiment of Distance Calculator 406.

In an embodiment, Datapath MUX 502 is configured to distribute feature vector information associated with one dimension, a mean value associated with a corresponding dimension of a Gaussian probability distribution, and a variance value associated with the corresponding dimension of the Gaussian probability to each of ALUs $506_1$-$506_8$.

Based on the feature vector, the mean value, and the variance value for a respective ALU, each of ALUs $506_1$-$506_8$ is configured to calculate a distance score based on a feature vector dimension and a corresponding Gaussian probability distribution dimension. The architecture and operation of the ALU is described in further detail below.

The number of ALUs in Distance Calculator 406 can be designed such that Distance Calculator 406 outputs a distance score for one Gaussian probability distribution for every read access to Acoustic Model 306, according to an embodiment of Accelerator 206. For example, with a feature vector of 39 dimensions and eight ALUs, a Gaussian distance score for one Gaussian probability distribution can be calculated in five SSU iterations. Therefore, by design, the timing of five SSU iterations corresponds to one Acoustic Model 306 read. A Gaussian distance score for a Gaussian probability distribution is calculated by Accumulator 508.

Based on the description herein, a person skilled in the relevant art will recognize that the architecture of Distance Calculator 406 is not limited to the above example. Rather, as would be understood by a person skilled in the relevant art, Distance Calculator 406 can operate in faster or slower with respect to Acoustic Model 306 read depending on the number of dimensions in the feature vectors and the number of ALUs 506 in Distance Calculator 406.

In reference to FIG. 5, Accumulator 508 is configured to receive the outputs from each of ALUs $506_1$-$506_8$ and the Gaussian weighting factor from Datapath MUX 502. As discussed above, in an embodiment, for every SSU iteration, a distance score for a Gaussian probability distribution dimension is outputted by each of ALUs $506_1$-$506_8$. These distance scores from each of ALUs $506_1$-$506_8$ are stored and accumulated by Accumulator 508 to generate a distance score for the Gaussian probability distribution dimension, or Gaussian distance score—e.g., Accumulator 508 adds respective distance scores calculated by ALUs $506_1$-$506_8$ per SSU iteration.

In an embodiment, after the Gaussian distance scores associated with all of the Gaussian probability distribution dimensions for a given Gaussian probability distribution are accumulated in Accumulator 508 (e.g., 39 dimensions), Accumulator 508 multiplies the total sum by the Gaussian weighting factor to generate a weighted Gaussian distance score. In an embodiment, the Gaussian weighting factor is optional, where Accumulator 508 outputs the Gaussian distance score. In another embodiment, the Gaussian weighting factor is specific to each Gaussian and is stored in Acoustic Model 306 of FIG. 3.

In reference to FIG. 4, Addition Module 408 is configured to add one or more Gaussian distance scores (or weighted Gaussian distance scores) to generate a senone score. As discussed above, each senone can be composed of one or more Gaussian probability distributions, in which each Gaussian probability distribution can be associated with a Gaussian distance score. For a senone with a plurality of Gaussian probability distributions (e.g., five Gaussian probability distributions), Addition Module 408 sums the Gaussian distance scores associated with all of the Gaussian probability distributions to generate the senone score. In an embodiment, Addition Module 408 is configured to perform the summation operation in the log domain to generate the senone score.

Output Buffer 410 is configured to receive a senone score from Addition Module 408 and transfer the senone score to Controller 302 of FIG. 3. In an embodiment, Output Buffer 408 can include a plurality of memory buffers such that, as a first senone score in a first memory buffer is being transferred to Controller 302, a second senone score generated by Addition Module 408 can be transferred to a second memory buffer for a subsequent transfer to Controller 302.

Once all the senones have been processed for all feature vectors using the same Acoustic Model 306, Controller 302 transfers the set of senone scores to Server CPU 204 for further processing.

As shown in FIG. 2, System 200 can comprise multiple Accelerators 206. The Accelerators 206 can be optimized in different ways, e.g., having a different number of SSUs 304, having a different number of Acoustic Models 306, having a different number of ALUs 506 within the SSUs 304, etc.

3. Scoring Multiple Acoustic Input Streams Process

Figure 6:
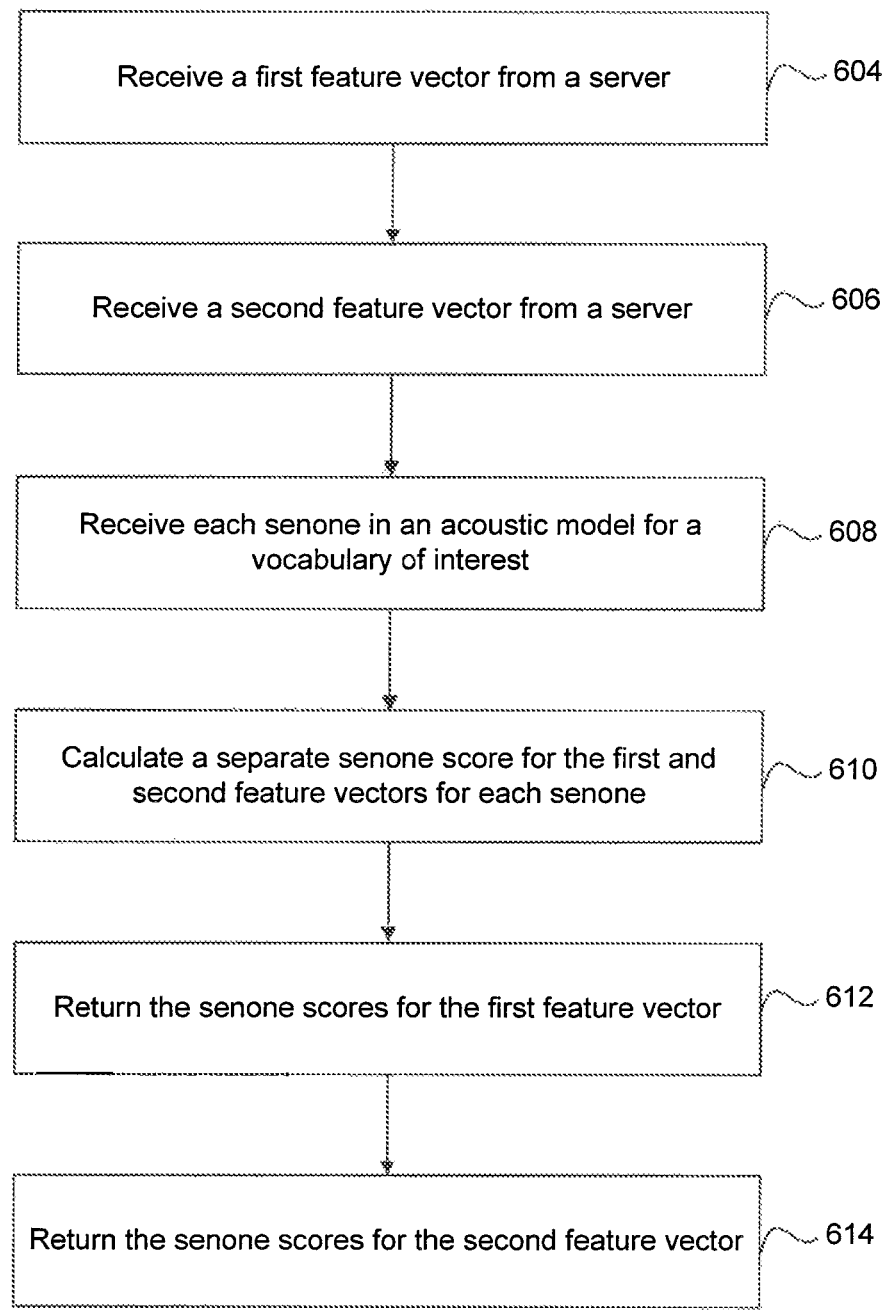
FIG. 6 is an illustration of an embodiment of a method of processing multiple feature vectors according to an embodiment of the present invention.

Flowchart 602 in FIG. 6 illustrates an embodiment of a process to score multiple acoustic input streams, for example using Accelerator 206 of FIG. 2. In step 604, an embodiment of the present invention receives a first feature vector of a first input stream from a server, for example Server CPU 204. In step 606, an embodiment of the present invention receives a second feature vector of a second input stream from the server, for example Server CPU 204. In an embodiment, the first and second feature vectors each are composed of X dimensions, where X can equal, for example, 39. In an embodiment, prior to receiving the feature vectors, the input streams can use a Model_ID to indicate which vocabulary or Acoustic Model 306 to be applied in the speech recognition process. The server includes the Model_ID, identifying the vocabulary or Acoustic Model 306 for the feature vector, with the feature vector when sending it to the accelerator.

In step 608, an embodiment of the present invention receives one or more Gaussian probability distributions representing a senone associated with an acoustic model. For example, a SSU, such as one of SSUs 304, can each receive the Gaussian probability distributions for senones associated with a particular acoustic model associated with a feature vector.

For SSUs scoring feature vectors using the same acoustic model, the SSUs can process the same senones concurrently. In an embodiment, the feature vectors can be scored using the same senone in parallel or substantially in parallel. This reduces the contention for memory bandwidth between multiple SSUs, for example SSUs 304, and the acoustic model, for example Acoustic Model 306. In an embodiment, both the first and second feature vectors are evaluated using the same senones from the same acoustic model.

In an embodiment, the Gaussian probability distributions each have the same number of dimensions as the first and second feature vector, e.g., 39. In an embodiment, the Gaussian probability distributions are received in a staggered fashion so that they can be processed in a pipelined manner by a distance calculator, for example Distance Calculator 406.

In step 610, a separate senone score is calculated for both the first and second feature vectors with respect to the senone, for example by the Distance Calculators 406 in two SSUs 304. Based on the number of Gaussian probability distributions and the number of ALUs in the distance calculators, Accelerator 206 can execute multiple scoring iterations for each acoustic model read. For example, the Gaussian probability distribution may have 39 dimensions and there may be eight ALUs in the Distance Calculator 406. For such a design, Accelerator 206 could execute five scoring iterations (thereby scoring all of the Gaussian probability distribution dimensions) for each acoustic model read. In an embodiment, multiple SSUs 304, addressing unique dimensions of the first and second feature vector, can be executing at the same time.

In an embodiment, steps 608 and 610 are repeated for each senone within the acoustic model, for example Acoustic Model 306.

In step 612, an embodiment returns the senone scores hr the first feature vector. And in step 614, an embodiment returns the senone scores for the second feature vector. For example, the senone scores can be returned to the controller.

An embodiment can receive a third feature vector of a third input stream, for example from the server. The third feature vector can be associated with another vocabulary or Acoustic Model 306 will be applied to the speech recognition process. This embodiment receives one or more Gaussian probability distributions representing another senone associated with the another acoustic model associated with the feature vector. This embodiment can calculate a distance score between received feature vector and the another senone from the another acoustic model, in a similar manner as described above. Furthermore, the embodiment can process the third feature vector concurrent with processing the first and second feature vectors. Thus, the embodiment can process acoustic models that can be different sizes or take a different amount of time to process concurrently. For example, the embodiment could start processing acoustic model A, e.g., an English acoustic model, for the first and second feature vectors. Later it could start processing acoustic model B, e.g., a French acoustic model, for the third feature vector, while continuing to process acoustic model A for the first and second feature vectors. Eventually the embodiment would finish with processing both acoustic model A and B, independent of the status of the processing of the other acoustic model.

The embodiments above describe ways of processing speech from multiple sources while reducing the resource intensive nature of speech recognition and allowing real-time or close to real-time speech recognition. By sharing data retrieved from an acoustic model between multiple senone score units calculating distances for multiple input streams, bottlenecks related to accessing the acoustic model can be reduced. Further, by grouping input streams based on the vocabulary being used and allowing all input streams using the same vocabulary to use the same shared acoustic data, the speech recognition accelerator can realize a reduction in memory latency of up to A/M where A is the number of feature vectors being processed in concurrently and the M is the number of vocabularies being used.

4. Exemplary Computer System

Figure 7:
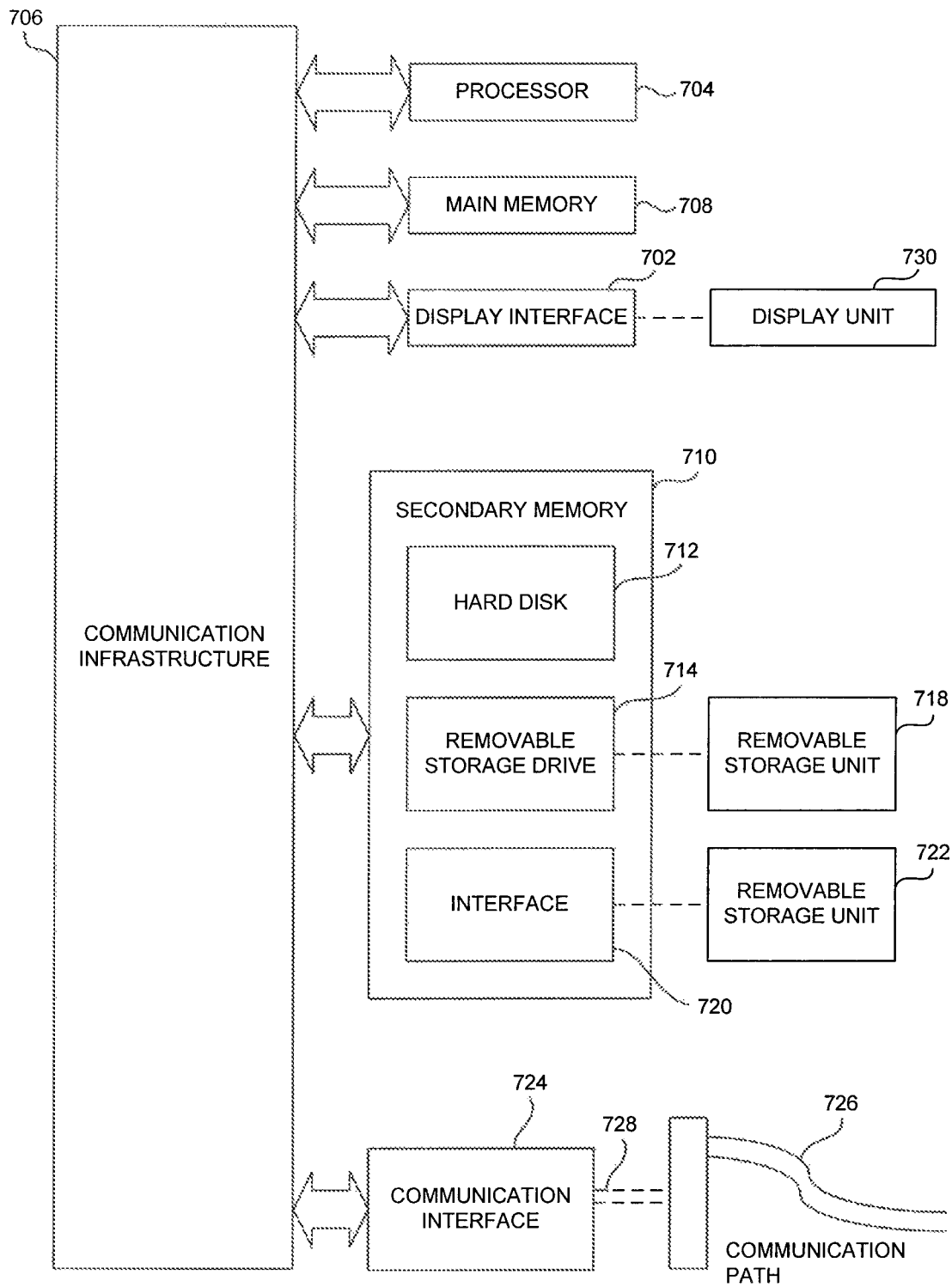
FIG. 7 is an illustration of an example computer system in which embodiments of the present invention, or portions thereof, can be implemented as computer readable code.

Various aspects of the present invention may be implemented in software, firmware, hardware, or a combination thereof. FIG. 7 is an illustration of an example Computer System 700 in which embodiments of the present invention, or portions thereof, can be implemented as computer-readable code. For example, the method illustrated by Flowchart 602 of FIG. 6 can be implemented in Computer System 700. Various embodiments of the present invention are described in terms of this example Computer System 700. After reading this description, it will become apparent to a person skilled in the relevant art how to implement embodiments of the present invention using other computer systems and/or computer architectures.

It should be noted that the simulation, synthesis and/or manufacture of various embodiments of this invention may be accomplished, in part, through the use of computer readable code, including general programming languages (such as C or C++), hardware description languages (HDL) such as, for example, Verilog HDL, VHDL, Altera HDL (AHDL), or other available programming and/or schematic capture tools (such as circuit capture tools). This computer readable code can be disposed in any known computer-usable medium including a semiconductor, magnetic disk, optical disk (such as CD-ROM, DVD-ROM). As such, the code can be transmitted over communication networks including the Internet. It is understood that the functions accomplished and/or structure provided by the systems and techniques described above can be represented in a core (e.g., a ACP core) that is embodied in program code and can be transformed to hardware as part of the production of integrated circuits.

Computer System 700 includes one or more processors, such as Processor 704. Processor 704 may be a general-purpose or a special purpose processor such as, for example, the Server CPU 204 of FIG. 2 and the Accelerator 206 of FIG. 2, respectively. Processor 704 is connected to a Communication Infrastructure 706 (e.g., a bus or network).

Computer System 700 also includes a Main Memory 708, preferably random access memory (RAM), and may also include a Secondary Memory 710. Secondary Memory 710 can include, for example, a Hard Disk Drive 712, a Removable Storage Drive 714, and/or a memory stick. Removable Storage Drive 714 can include a floppy disk drive, a magnetic tape drive, an optical disk drive, a flash memory, or the like. The Removable Storage Drive 714 reads from and/or writes to a Removable Storage Unit 718 in a well-known manner. Removable Storage Unit 718 can comprise a floppy disk, magnetic tape, optical disk, etc. which is read by and written to by Removable Storage Drive 714. As will be appreciated by persons skilled in the relevant art, Removable Storage Unit 718 includes a computer-usable storage medium having stored therein computer software and/or data.

Computer System 700 (optionally) includes a Display Interface 702 (which can include input and output devices such as keyboards, mice, etc.) that forwards graphics, text, and other data from Communication Infrastructure 706 (or from a frame buffer not shown) for display on Display Unit 730.

In alternative implementations, Secondary Memory 710 can include other similar devices for allowing computer programs or other instructions to be loaded into Computer System 700. Such devices can include, for example, a Removable Storage Unit 722 and an Interface 720. Examples of such devices can include a program cartridge and cartridge interface (such as those found in video game devices), a removable memory chip (e.g., EPROM or PROM) and associated socket, and other Removable Storage Units 722 and Interfaces 720 which allow software and data to be transferred from the Removable Storage Unit 722 to Computer System 700.

Computer System 700 can also include a Communications Interface 724. Communications Interface 724 allows software and data to be transferred between Computer System 700 and external devices. Communications Interface 724 can include a modem, a network interface (such as an Ethernet card), a communications port, a PCMCIA slot and card, or the like. Software and data transferred via Communications Interface 724 are in the form of signals which may be electronic, electromagnetic, optical, or other signals capable of being received by Communications Interface 724. These signals are provided to Communications Interface 724 via a Communications Path 726. Communications Path 726 carries signals and can be implemented using wire or cable, fiber optics, a phone line, a cellular phone link, a RF link or other communications channels.

In this document, the terms "computer program medium" and "computer-usable medium" are used to generally refer to media such as Removable Storage Unit 718, Removable Storage Unit 722, and a hard disk installed in Hard Disk Drive 712. Computer program medium and computer-usable medium can also refer to memories, such as Main Memory 708 and Secondary Memory 710, which can be memory semiconductors (e.g., DRAMs, etc.). These computer program products provide software to Computer System 700.

Computer programs (also called computer control logic) are stored in Main Memory 708 and/or Secondary Memory 710. Computer programs may also be received via Communications Interface 724. Such computer programs, when executed, enable Computer System 700 to implement embodiments of the present invention as discussed herein. In particular, the computer programs, when executed, enable Processor 704 to implement processes of embodiments of the present invention, such as the steps in the method illustrated by Flowchart 602 of FIG. 6. Accordingly, such computer programs represent controllers of the Computer System 700. Where embodiments of the present invention are implemented using software, the software can be stored in a computer program product and loaded into Computer System 700 using Removable Storage Drive 714, Interface 720, Hard Disk Drive 712, or Communications Interface 724.

Embodiments of the present invention are also directed to computer program products including software stored on any computer-usable medium. Such software, when executed in one or more data processing device, causes a data processing device(s) to operate as described herein. Embodiments of the present invention employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage devices, etc.), and communication mediums (e.g., wired and wireless communications networks, local area networks, wide area networks, intranets, etc.).

5. Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventors, and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the relevant art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for processing a plurality of feature vectors, the method comprising:
   receiving a first feature vector and a second feature vector from a server device;
   accessing an acoustic model for a senone; and
   concurrently calculating a first senone score associated with the first feature vector and a second senone score associated with the second feature vector both based on the senone, wherein the calculating comprises a single read access to the acoustic model when calculating the first and second senone scores.

2. The method according to claim 1, further comprising:
   accessing the acoustic model for another senone; and
   concurrently calculating a third senone score associated with the first feature vector and a fourth senone score associated with the second feature vector both based on the another senone, wherein the calculating comprises another single read access to the acoustic model when calculating the third and fourth senone scores.

3. The method according to claim 1, further comprising:
   receiving an indication of a first vocabulary associated with the first feature vector and the second feature vector, wherein the first vocabulary is associated with the acoustic model.

4. The method according to claim 3, further comprising:
   receiving a third feature vector from the server device;
   receiving an indication of a second vocabulary associated with the third feature vector, wherein the second vocabulary is associated with another acoustic model;
   accessing the another acoustic model for another senone; and
   calculating a third senone score based on the another senone; wherein the calculating the third senone score comprises another single read access to the another acoustic model concurrent with the single read access.

5. The method according to claim 3, further comprising:
   receiving a third feature vector from the server device;
   receiving an indication of a second vocabulary associated with the third feature vector, wherein the second vocabulary is associated with the acoustic model;
   accessing the acoustic model for another senone; and
   calculating a third senone score based on the another senone; wherein the calculating the third senone score comprises another single read access to the acoustic model serially with the single read access.

6. The method according to claim 1, further comprising:
   transmitting the first senone score and the second senone score to the server device.

7. An acoustic processing acceleration device for processing a plurality of feature vectors, the device comprising:
   an acoustic model configured to store one or more senones associated with a vocabulary;

a controller configured to receive a set of feature vectors; and a plurality of senone score units (SSUs), each configured to receive a feature vector from the controller and a senone from the acoustic model and to concurrently calculate a distance score based on the senone and the feature vector;

wherein the plurality of SSUs receive the senone from the acoustic model during a single read access.

8. The acoustic processing acceleration device according to claim 7, wherein the plurality of SSUs receive a plurality of senones from the acoustic model sequentially.

9. The acoustic processing acceleration device according to claim 7, further comprising:

one or more additional acoustic models, wherein each feature vector in the set of feature vectors is associated with the acoustic model, the one or more additional acoustic models, or a combination thereof.

10. The acoustic processing acceleration device according to claim 7, wherein each of the plurality of SSUs is configured to receive the feature vector from the controller and to transmit the distance score to the controller.

11. The acoustic processing acceleration device according to claim 7, further comprising:

another acoustic model configured to store another one or more senones associated with another vocabulary; and a second plurality of SSUs, each configured to receive another feature vector from the controller and another senone from the another acoustic model and to concurrently calculate another distance score based on the another senone and the another feature vector;

wherein the second plurality of SSUs receive the another senone from the another acoustic model during another single read access.

12. The acoustic processing acceleration device according to claim 11, wherein the single read access and the another single read access are concurrent.

13. The acoustic processing acceleration device according to claim 7, further comprising:

a second plurality of SSUs, each configured to receive another feature vector from another set of feature vectors and another senone from the acoustic model and to concurrently calculate another distance score based on th.e another senone and the another feature vector;

wherein the second plurality of SSUs receive the another senone from the another acoustic model during another single read access; and the acoustic model is further configured to store the another one or more senones associated with another vocabulary.

14. A speech recognition system comprising:

a server device with system memory; and an acoustic processing acceleration device, coupled to the server device, wherein the acoustic processing acceleration device comprising:

an acoustic model configured to store one or more senones associated with a vocabulary;

a controller configured to receive a set of feature vectors from the server device; and a plurality of senone score units (SSUs), each configured to receive a feature vector from the controller and a senone from the acoustic model and to concurrently calculate a distance score based on the senone and the feature vector;

wherein the plurality of SSUs receive the senone from the acoustic model during a single read access.

15. The speech recognition system of claim 14, wherein the plurality of SSUs receive a plurality of senones from the acoustic model sequentially.

16. The speech recognition system of claim 14, wherein the acoustic processing acceleration device further comprises:

one or more additional acoustic models, wherein each feature vector in the set of feature vectors is associated with the acoustic model, the one or more additional acoustic models, or a combination thereof.

17. The speech recognition system of claim 14, wherein the acoustic processing acceleration device further comprises:

another acoustic model configured to store another one or more senones associated with another vocabulary; and a second plurality of SSUs, each configured to receive another feature vector from the controller and another senone from the another acoustic model and to concurrently calculate another distance score based on the another senone and the another feature vector;

wherein the second plurality of SSUs receive the another senone from the another acoustic model during another single read access.

* * * * *